N. J. WIGGINTON.
FRICTION CLUTCH.
APPLICATION FILED APR. 3, 1912.
1,089,171.
Patented Mar. 3, 1914.
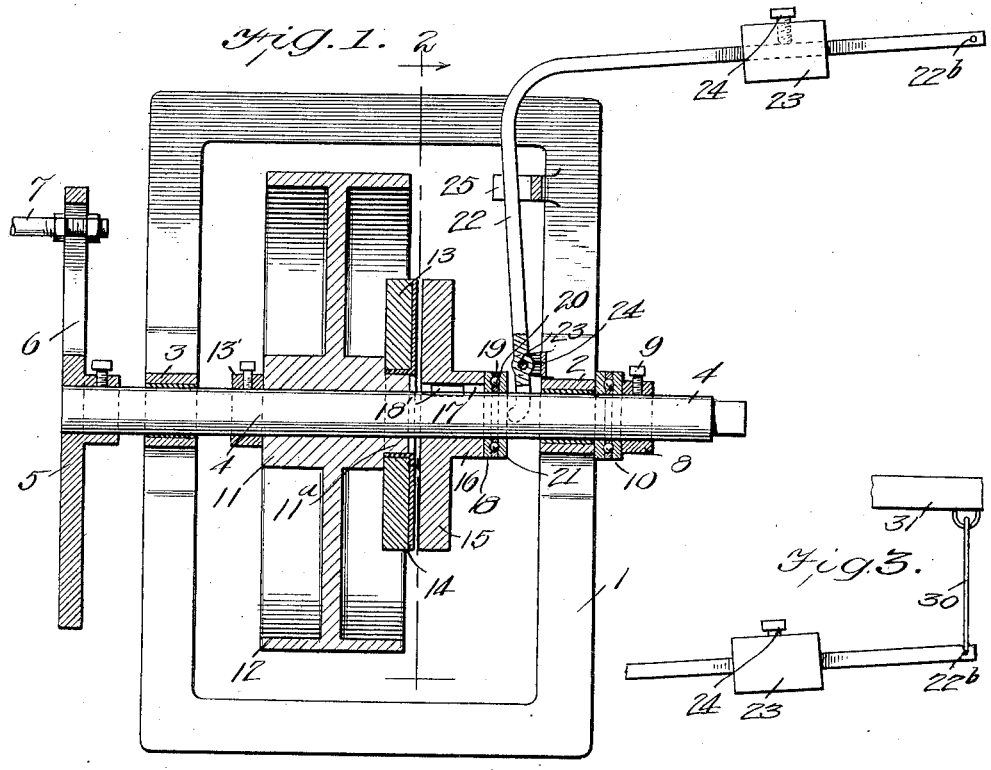
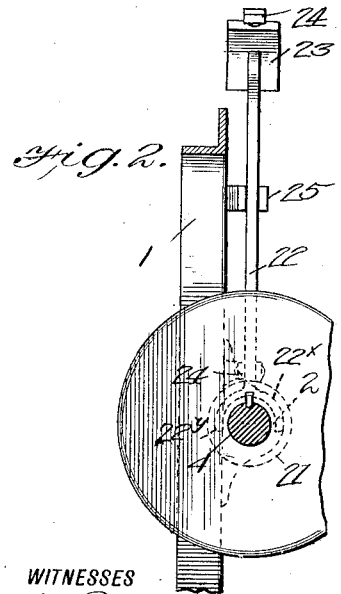
WITNESSES
Y. C. Barry
L. A. Stanley
INVENTOR
Newton J. Wigginton
BY Munn & Co.
ATTORNEYS

UNITED STATES PATENT OFFICE.

NEWTON J. WIGGINTON, OF WINCHESTER, VIRGINIA.

FRICTION-CLUTCH.

1,089,171.  Specification of Letters Patent.  Patented Mar. 3, 1914.

Application filed April 3, 1912. Serial No. 688,191.

*To all whom it may concern:*

Be it known that I, NEWTON J. WIGGINTON, a citizen of the United States, and a resident of Winchester, in the county of Frederick and State of Virginia, have made certain new and useful Improvements in Friction-Clutches, of which the following is a specification.

My invention relates to improvements in friction clutches, and it consists in the combinations, constructions and arrangements herein described and claimed.

An object of my invention is to provide a friction clutch which will transmit to a machine a given amount of power, and which, when the load on the machine increases beyond a certain point will turn idly, thereby obviating any danger of injury to the machine, such as might occur if the clutch were not used.

A further object of my invention is to provide means for increasing or decreasing the frictional resistance between the clutch members so as to cause the slipping of the clutch at a predetermined load.

A further object of my invention is to provide a simple form of friction clutch which has few parts and which will not easily get out of order.

Other objects and advantages will appear in the following specification, and the novel features of the device will be particularly pointed out in the appended claims.

My invention is illustrated in the accompanying drawings forming part of this application, in which similar reference characters indicate like parts in the several views, and in which—

Figure 1 is a sectional view of the device, Fig. 2 is a section along the line 2—2 of Fig. 1, and Fig. 3 is a detail view of means for locking up the clutch lever.

In carrying out my invention I provide a frame 1 of a rectangular shape such as that shown in Fig. 1. The frame is provided with bearings 2 and 3 arranged to receive a shaft 4. At one end of the shaft is a crank wheel 5 provided with a slot 6 arranged to receive a crank pin 7. The opposite end of the shaft 4 is provided with a collar 8 which is secured by means of a set screw 9 to the shaft, a thrust bearing 10 being provided between the collar and the bearing 2.

Within the frame 1 upon the shaft 4 is mounted the hub 11 of a drive wheel or drum 12. A collar 13 disposed on the shaft 4 keeps the drum from sliding toward the frame. The opposite end of the hub is formed into a reduced portion $11^a$ upon which is mounted a plate 13 which is faced with leather 14 or other suitable material. The plate 13 with its leather facing 14 constitutes one of the friction members. The other friction member consists of a circular plate 15 which is provided with a hub 16, the plate and the hub being traversed by a slot 17 into which a fixed key 18 secured to the shaft 4 extends. Arranged to engage the end of the hub 15 is a plate 18, adjacent to which is a plate 19 carrying balls 20, a plate 21 engaging the ball-carrying plate 19 on the opposite side. The shaft 4 passes through the three plates 18, 19 and 21 as shown.

A lever 22 is pivoted at 23 to a lug 24 on the frame 1, and is provided with a yoke $22^x$ whose ends are turned toward the plate 21, as shown at $22^y$. The ends of the yoke straddle the shaft 4 and engage the plate 21 on opposite sides of the shaft. A slidable weight 23 is disposed on the upper bent end of the lever 22 and is provided with a set screw 24. The lever may be guided by a slotted guide lug 25.

From the foregoing description of the various parts of the device the operation thereof may be readily understood. Power is applied to the wheel 12 which is loosely mounted on the shaft 4. Owing to the presence of the weight 23 the end $22^y$ of the lever will be forced into contact with the plate 21, which in turn will force the plate 15 against the surface of the plate 13, through the medium of the plates 18 and 19. Owing to the frictional resistance between the plates 13 and 15, the movement of the wheel 12 will be transmitted to the shaft 4, thereby causing the revolution of the crank wheel 5. The crank wheel may drive any machinery by attaching the proper driving mechanism to the crank pin 7. If now, the load should become too great on the machine, so that the drag on the member 15 is considerable, then the member 13 will slip, thus preventing injury to the machine. The point at which the slipping of the clutch occurs may be varied by moving the weight 23 along the lever 22. Thus when it is moved to the outer end, the plate 15 will be forced against the plate 13 with a maximum pressure, while the movement of the weight inwardly decreases the pressure.

It will be seen that I have provided a device in which power up to a certain limit may be transmitted to a machine, but that when that limit is reached no more power will be transmitted. This maximum limit is constant where the weight is kept at a certain place on the lever, or where the spring is set with a given tension, but varies as the weight is shifted on the lever or as the tension in the spring is varied.

I am aware that other forms of the device based on the same general plan might be made, but I consider as my own all such modifications as fairly fall within the spirit and the scope of the invention.

I claim:—

1. In a friction clutch mechanism, a shaft, a pair of clutch members, one of said clutch members being movable longitudinally of the shaft, and means for moving said last named member, said means comprising a lever having a yoke arranged to straddle the shaft and adapted to engage said movable member, a portion of said lever being bent laterally into a horizontal position and being provided with a slidable weight for varying the thrust of the lever.

2. In a friction clutch mechanism, a pair of clutch members, a lever for causing the engagement of said clutch members, said lever having a laterally bent substantially horizontal portion, a weight supported by the horizontal portion and adjustable to various positions along the lever, and means for locking the weight in its adjusted position.

NEWTON J. WIGGINTON.

Witnesses:
  JAS. B. RUSSELL,
  MAURICE M. LYNCH.

---

Copies of this patent may be obtained for five cents each, by addressing the "Commissioner of Patents, Washington, D. C."